Patented May 7, 1935

2,000,450

UNITED STATES PATENT OFFICE 2,000,450

PROCESS OF MAKING CEREAL COFFEE

Athniel Kloss, Scobey, Mont.

No Drawing. Application December 19, 1930,
Serial No. 503,490

3 Claims. (Cl. 99—11)

This process relates to the making of a cereal coffee, and consists in treating certain grains in a manner as will be hereinafter more fully pointed out and combining the same as herein defined, to provide a dry finished cereal coffee which may be packaged in the desired manner for the consumer.

This process includes the making of a cereal coffee using the entire kernels of grain, such as wheat and rye with a small percentage of sugar and salt, and is carried out in a particular manner so as not to lose any of the food value portions of the grain or kernels thereof in making the same into the cereal coffee and without breaking the kernels of grain or powdering the same. In a process where a cereal coffee is made of grain and the kernels are broken up or crushed, a certain powder or dust-like portion is broken away from the kernels, rather than keeping the same in a certain size when steel cut by a machine designed for that purpose to a size and shape, similar to regular steel cut coffee. With my process, there is no loss of the kernels of grain through the powdering by crushing of the same, and the simplicity in handling the grains provides a process of preparing and finishing the cereal coffee in a more desirable manner than has been accomplished heretofore.

The process of making my cereal coffee includes first cleaning the grain such as the rye and wheat or other grains that may be desired to be used in this coffee, each grain being cleaned separately. After the grain has passed through the first cleaning process which removes the foul seeds, straw, chaff etc., it is then cleaned again by a power cleaner in a similar manner as flour mills clean grain for the making of flour and when thoroughly cleaned the kernels of grain are steel cut by a machine for that purpose to a size and shape, similar to steel cut regular coffee.

Each grain is handled separately up to this part of the process. This permits an accurate mixing of the grain in the proportions as will be hereinafter pointed out. In the next step of the process of making my cereal coffee, the steel cut kernels of the respective grains are then mixed in the following proportions: 90% of a mixture formed of 33⅓% of cut wheat, 66⅔% of cut rye, 9% of white granulated sugar and 1% of salt. In this proportion, the grain, sugar and salt are placed in a power mixer and thoroughly mixed in the dry form. After the cut grain has been thoroughly and completely mixed dry in the power mixer with the salt and sugar, steam is applied to this mixture with the mixing process continuing until every cut kernel is well moistened and the sugar and salt have been thoroughly penetrated into the cut kernels so that the mixture is complete, not wet but sufficiently moist to accomplish a thorough mixing and seasoning of the cut kernels with the salt and sugar.

The moist mixture is then put into a power drier until fully and completely dry. After the mixture is thoroughly dry, it is toasted or roasted to the desired color in a power roaster and after it has cooled, is ready to be boxed for distribution.

The steps of my process are important namely, in keeping the particles of the different kernels of grain separate which have been steel cut to a size and shape desired, or similar to regular steel cut coffee and in this particle-like formation, the kernels are not crushed but each particle of the kernel remains intact and there is no waste or powdering of the kernels. The kernels of grain have a certain amount of moisture and oily substance which is sufficient to cause the sugar and salt to adhere thereto while these particles are being mixed as above set forth so that the sugar and salt are thoroughly mixed in a dry state with the particles of the cut kernels of the grain before the steam is applied. When the steam is applied in the mixing of the cereal cut kernels a slight swelling takes place causing the sugar and salt to be absorbed into the particles of the kernels flavoring the same and retaining this flavoring when dried and roasted. In this manner, my process provides a cereal coffee having a very fine flavor and without any ground or powder-like formation so that when coffee is made from the same, a clear and flavored beverage is the result, rather than a muggy or cloudy cereal coffee.

I claim:

1. The process of making a cereal coffee consisting in cleaning separately each of a variety of kernels of grain by removing foul seeds, straw and chaff, then cleaning the kernels to the point of polishing, then steel cutting the kernels to the size and shape desired, then taking 90% of a mixture formed of 33⅓% of the cut kernals of one kind of grain and adding it to 66⅔% of cut kernels of another kind of grain and adding to this mixture 9% of granulated sugar and 1% of salt and then thoroughly mixing in a dry state, after which steam is applied while the mixing process continues and then drying the same after which toasting to the desired color.

2. The process of making cereal coffee consisting in thoroughly cleaning kernels of wheat and rye and steel cutting the kernels, each grain being kept separate during the cleaning and cutting, then mixing 33⅓% of cut wheat with 66⅔% of cut rye, to 90% of this mixture adding 9% of sugar, and 1% of salt and thoroughly dry agitating in a power mixer after which steam is applied and the mixing process continued until the particles of grain have absorbed the desired moisture, then power drying and toasting to color the same as desired.

3. The method of making cereal coffee consisting in separately cleaning and cutting different kernels of grain without crushing the same, then mixing about ⅓ of one grain with about ⅔ of another grain and adding to about 90% of this mixture about 9% of sugar with 1% of salt and thoroughly mixing the same in a dry state and when thoroughly mixed applying steam in contact with the cut kernels to moisten the same after which the cut mixed kernels are fully dried and then roasted to the desired color.

ATHNIEL KLOSS.